United States Patent [19]

Dommer et al.

[11] Patent Number: 4,631,237
[45] Date of Patent: Dec. 23, 1986

[54] WIRE ELECTRODE FOR SPARK-ERODING SYSTEMS

[75] Inventors: Erich Dommer, Heuchelheim; Heinrich Groos, Herborn, both of Fed. Rep. of Germany

[73] Assignee: Berkenhoff GmbH, Heuchelheim-Kinzenbach, Fed. Rep. of Germany

[21] Appl. No.: 723,992

[22] Filed: Apr. 17, 1985

[30] Foreign Application Priority Data

Apr. 21, 1984 [DE] Fed. Rep. of Germany ....... 3415054

[51] Int. Cl.$^4$ .............................................. B23P 1/12
[52] U.S. Cl. .................................... 428/621; 428/624; 428/658; 428/674; 420/477; 420/491; 420/495; 420/496; 420/499; 219/69 W; 219/69 E; 219/69 M
[58] Field of Search ............... 428/621, 658, 674, 624; 219/69 W, 69 E, 69 M; 420/495, 496, 477, 491, 499

[56] References Cited

U.S. PATENT DOCUMENTS 4,287,404 9/1981 Convers et al. ....................... 219/69

FOREIGN PATENT DOCUMENTS 2906245 9/1979 Fed. Rep. of Germany .

OTHER PUBLICATIONS

DIN 17 666, "*Low Alloy Wrought Copper Alloys*", UDC 669.35.018.26–4, Dec. 1983.

*Primary Examiner*—Veronica O'Keefe
*Attorney, Agent, or Firm*—Flynn, Thiel, Boutell & Tanis

[57] ABSTRACT

A wire electrode for a spark-eroding system for erosion cutting of workpieces using intermittent electrical charges includes a core of a current-conducting material and a wire coating of a material with a lower evaporation temperature, for example zinc. The core consists of one of the following alloys according to DIN (German Industrial Standard) 17666:

(a) Cu Mg 0.4;
(b) Cu Fe 2P;
(c) Cu Cr Zr;
(d) Cu Zr.

8 Claims, 1 Drawing Figure

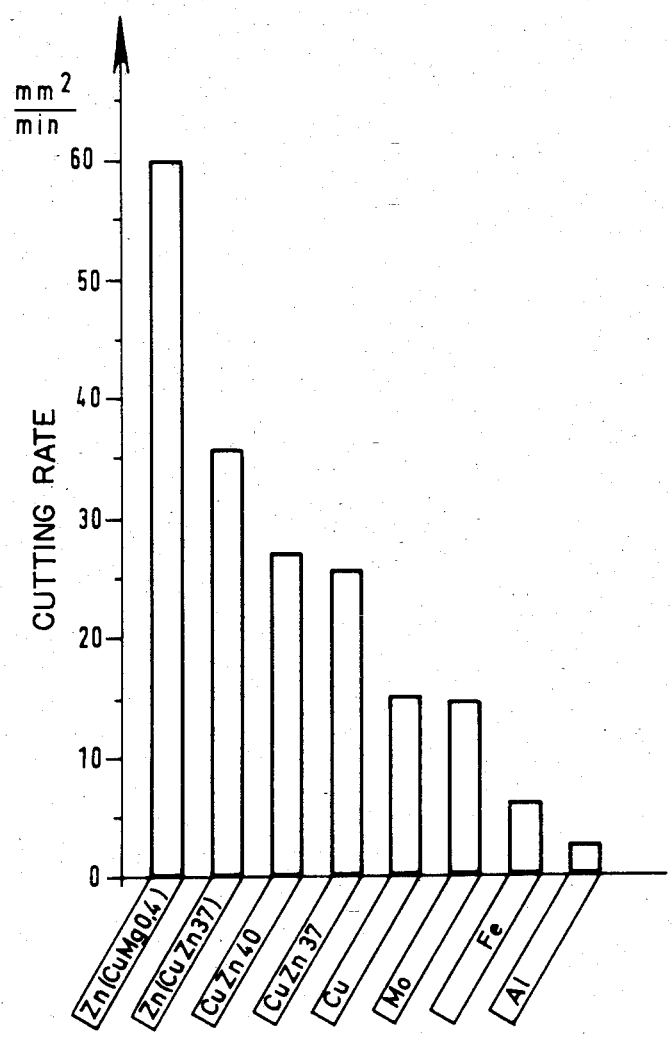

WIRE ELECTRODE FOR SPARK-ERODING SYSTEMS

FIELD OF THE INVENTION

This invention relates to a wire electrode for a spark-eroding system for cutting of workpieces by eroding with intermittent electrical charges, and more particularly to a wire electrode which has a core of a current-conducting material and a wire coating of a material with a lower evaporation temperature, for example zinc.

BACKGROUND OF THE INVENTION

Initially, pure copper wires were used as wire electrodes, which copper wires have been replaced with brass wires having a greater mechanical tensile strength. Compared with the pure brass electrode, a wire electrode which is provided with a coating has proven to be advantageous, in particular a coating of a material which has a low evaporation temperature. Such a wire electrode has become known from German Offenlegungsschrift No. 29 06 245. Particularly advantageous is a coating of zinc which, in the sequence of elements which are organized according to their evaporation points, is the first metal free of corresponding difficulties in use, which result for example from too great a chemical reactivity or toxicity. This metal wears off easily or erodes easily, but this is not a disadvantage because, during spark-erosive wire cutting, the wire part used is continuously renewed.

The brass-wire electrodes which are coated with zinc have brought about a considerable increase in cutting performance, but these brass-wire electrodes still have the disadvantage that, during final annealing of the wire to adjust same to the needed solidity, a portion of the zinc diffuses into the brass core, which necessitates increased energy for setting free the zinc which is needed for the eroding action.

A basic purpose of the invention is to provide a wire electrode which has, compared with the known brass-wire electrode coated with a zinc layer, a substantially increased cutting performance and in which the diffusing of the zinc into the wire core is substantially reduced.

SUMMARY OF THE INVENTION

This purpose is attained inventively by providing an electrode which is of the type to which the invention relates and in which the core includes one of the following alloys according to DIN (German Industrial Standard) No. 17666: Cu Mg 0.4; Cu Fe 2P; Cu Cr Zr; Cu Zr.

DETAILED DESCRIPTION

The wire electrodes which are used for the sparkeroding method have a diameter in the range of 0.03 to 0.4 mm. Wire electrodes with diameters less than 0.1 mm have up to now only been utilized for special purposes. The development so far in wire electrodes, which effected the turning away from the first used copper wires to brass wires coated with zinc, had the purpose to increase the tensile strength of the wire electrodes in order to achieve a clean cutting gap. The cutting performance was increased by coating the wire electrodes with zinc, which substantially improved the eroding behavior. The Applicant has now found that, by using a core which is made of Cu Mg 0.4 or one of the other mentioned alloys and which is coated with a zinc coating in a conventional manner, a cutting performance which is increased by over 40% can be achieved. This increase in cutting performance is due to the fact that, on one hand, the alloys which are used as the core have a very good electrical conductivity and on the other hand simultaneously have a good mechanical solidity, so that the current which is supplied through the wire electrode can be increased to increase the cutting performance. Moreover, the alloys show the advantage that, in an adapted annealing treatment only a slight diffusion of the zinc coating into the core occurs, which has the advantage that the good electrical conductivity of the core is not negatively influenced by this. This causes at the same time the advantage that, for an equal electrical load of the eroding wire per unit of time, more free zinc is available for evaporation and ionization. Moreover, the supplied current is also utilized to a greater degree for the eroding action, whereas when a strong zinc diffusion into the surface of the core exists part of the current must be supplied as electrical discharge energy to activate the zinc again as free zinc from the homogeneous solid mixed crystal structure CuZn.

According to DIN (German Industrial Standard) No. 17666, the alloy designated as CuMg 0.4 has the composition:

Mg 0.3–0.5% by weight
Others up to 0.3% by weight
Cu balance % by weight the alloy designated as CuFe2P has the composition:

Fe 2.1–2.6% by weight
P 0.015–0.15% by weight
Pb up to 00.3% by weight
Zn 0.05–0.20% by weight
Others up to 0.5% by weight
Cu balance % by weight the alloy designated as CuCrZr has the composition:

Cr 0.3–1.2% by weight
Zr 0.03–0.3% by weight
Others up to 0.2% by weight
Cu balance % by weight and the alloy designated as CuZr has the composition:

Zr 0.1–0.3% by weight
Others up to 0.2% by weight
Cu balance % by weight.

The wire electrode can include up to 0.5% by weight of Ni, Zn and/or Pb.

The accompanying FIGURE shows the cutting performances of the materials which have been utilized up to now as wire electrodes. The cutting performances shown in the FIGURE are from experiments carried out under the following conditions: workpiece=$X$ 210 $Cr12$; $h$=50 mm; wire-$\phi$=0.25 mm; and $V_D$=40 mm/s. Here, aluminum has the lowest cutting performance. This is followed in the sense of higher cutting performances by pure iron, molybdenum and then copper. With the use of a brass electrode, it was possible in comparison with the copper electrode to achieve considerably higher cutting performances. These cutting performances could again be increased by galvanizing the wire electrode. A considerably greater jump in the cutting performance is then possible by using the inventive wire electrode.

According to a further suggestion of the invention, the wire electrode is provided with an insulating protective layer for reducing short-circuits with the workpiece, which in each case cause an interruption of the cutting operation through an automatically controlled stopping, driving back and further advancing, and for better running off of the wires from the storage spools and through the wire-guiding rollers and guideways through reduction of the mechanical friction, because the protective layer simultaneously functions as a sliding medium. Particularly advantageous is a protective layer on a saturated aliphatic hydrocarbon base. An increased charge is reached locally by the protective layer before sparkover, which also leads to a further increase of the cutting performance.

The embodiments of the invention in which an exclusive property or privilege is claimed are defined as follows:

1. In a wire electrode for spark-eroding systems for cutting of workpieces by eroding using intermittent electrical charges, including a core of a current-conducting material and a wire coating of a material having a lower evaporation temperature, the improvement which comprises: the core consists essentially of one of the following alloys:

(1) Mg 0.3–0.5% by weight
    Others up to 0.3% by weight
    Cu balance % by weight (2) Fe 2.1–2.6% by weight
    P 0.015–0.15% by weight
    Pb up to 0.03% by weight
    Zn 0.05–0.20% by weight
    Others up to 0.5% by weight
    Cu balance % by weight (3) Cr 0.3–1.2% by weight
    Zr 0.03–0.3% by weight
    Others up to 0.2% by weight
    Cu balance % by weight (4) Zr 0.1–0.3% by weight
    Others up to 0.2% by weight
    Cu balance % by weight.

2. The wire electrode according to claim 1, wherein the wire electrode is coated with a second, thin, insulating, anti-friction, coating layer.

3. The wire electrode according to claim 2, wherein the insulating layer is comprised of a saturated aliphatic hydrocarbon.

4. The wire electrode according to claim 1, in which said wire coating is made of zinc.

5. In a wire electrode for spark-eroding systems for cutting of workpieces by eroding using intermittent electrical charges, including a core of a current-conducting material and a wire coating of a material having a lower evaporation temperature, the improvement which comprises: the core consists essentially of one of the following alloys:

(1) Mg 0.3–0.5% by weight
    Others up to 0.3% by weight
    Cu balance % by weight (2) Fe 2.1–2.6% by weight
    P 0.015–0.15% by weight
    Pb up to 0.03% by weight
    Zn 0.05–0.20% by weight
    Others up to 0.5% by weight
    Cu balance % by weight (3) Cr 0.3–1.2% by weight
    Zr 0.03–0.3% by weight
    Others up to 0.2% by weight
    Cu balance % by weight (4) 0.1–0.3% by weight
    Others up to 0.2% by weight
    Cu balance % by weight,
    said alloy containing up to 0.5% by weight of at least one metal selected from the group consisting of Ni, Zn and Pb.

6. The wire electrode according to claim 5, wherein the wire electrode is coated with a second, thin, insulating, antifriction, coating layer.

7. The wire electrode according to claim 6, wherein the insulating layer is comprised of a saturated aliphatic hydrocarbon.

8. The wire electrode according to claim 5, in which said wire coating is made of zinc.

* * * * *